129,071

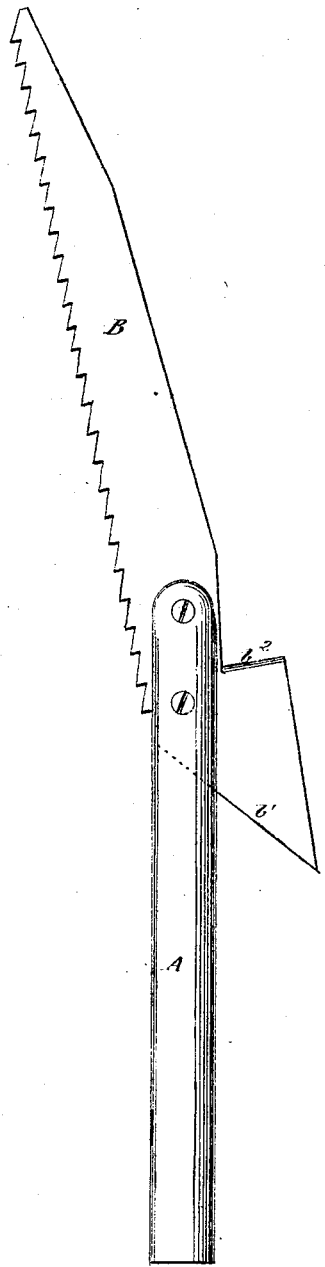

UNITED STATES PATENT OFFICE.

AARON TRAVIS, OF PEEKSKILL, NEW YORK.

IMPROVEMENT IN PRUNING-SAWS.

Specification forming part of Letters Patent No. 129,071, dated July 16, 1872.

Specification describing a new and useful Improvement in Pruning-Saws, invented by AARON TRAVIS, of Peekskill, in the county of Westchester and State of New York.

The figure is a side view of my improved pruinng-saw.

My invention has for its object to furnish an improved pruning-saw, simple in construction, convenient in use, and effective in operation, enabling the various operations of pruning trees to be readily performed; and it consists in the construction and combination of the various parts of the saw, as hereinafter more fully described.

A represents the handle of the saw, which may be of any desired length, and to the upper end of which is secured the saw-plate B. The teeth of the saw-plate B point toward the handle, so that the sawing may be done by pulling downward upon the saw. The saw-plate B is attached to the handle A in an inclined position, as shown in the figure, so that when the handle is pulled upon the saw will be drawn across the limb in proper position for sawing. The base or inner end of the saw-plate B is made inclined, and its rear corner $b^1$ projects in the rear of the handle A to serve as a hook for drawing the limbs out of the trees after they have been sawn off. In the rear edge of the saw-plate B is formed a notch, the straight shoulder of said notch being sharpened to serve as a chisel for cutting off small limbs. The inclined shoulder of the notch is made parallel or nearly parallel with the handle A, and the cutting-edge or chisel $b^2$ is nearly at right angles with said handle, but projecting slightly forward to cause it to keep in position upon the limb while cutting.

Having thus described my invention, I claim as new and desire to secure by Letters Patent—

The cutting-edge or chisel $b^2$, in combination with the hook $b^1$, saw-blade B, and handle A, said parts being constructed and operating substantially as herein shown and described, and for the purposes set forth.

AARON TRAVIS.

Witnesses:
JAMES T. GRAHAM,
T. B. MOSHER.